(12) United States Patent
Koppenhoefer (10) Patent No.: US 10,882,760 B1
(45) Date of Patent: Jan. 5, 2021

(54) SYSTEM AND METHOD FOR REDUCING WATER PUMP CYCLING AND TDS CREEP WHEN PRODUCING PURIFIED WATER

(71) Applicant: Benjamin John Koppenhoefer, Fort Lauderdale, FL (US)

(72) Inventor: Benjamin John Koppenhoefer, Fort Lauderdale, FL (US)

( * ) Notice: Subject to any disclaimer, the term of this patent is extended or adjusted under 35 U.S.C. 154(b) by 0 days.

(21) Appl. No.: 15/930,494

(22) Filed: May 13, 2020

(51) Int. Cl.
| C02F 1/00 | (2006.01) |
| C02F 1/44 | (2006.01) |
| B01D 61/08 | (2006.01) |
| B01D 61/02 | (2006.01) |
| B01D 61/12 | (2006.01) |
| B01D 65/02 | (2006.01) |

(52) U.S. Cl.
CPC ............ *C02F 1/008* (2013.01); *B01D 61/025* (2013.01); *B01D 61/08* (2013.01); *B01D 61/12* (2013.01); *B01D 65/02* (2013.01); *C02F 1/441* (2013.01); *B01D 2311/24* (2013.01); *C02F 2209/40* (2013.01); *C02F 2209/42* (2013.01); *C02F 2303/16* (2013.01); *C02F 2303/22* (2013.01)

(58) Field of Classification Search
CPC ........ C02F 1/008; B01D 61/025; B01D 61/12
See application file for complete search history.

(56) References Cited

U.S. PATENT DOCUMENTS

| 5,647,973 | A | * | 7/1997 | Desaulniers | ........... | B01D 61/12 |
| | | | | | | 210/195.2 |
| 5,928,503 | A | * | 7/1999 | Shang-Chun | .......... | B01D 61/08 |
| | | | | | | 210/104 |
| 6,908,546 | B2 | * | 6/2005 | Smith | ................. | A61M 1/1674 |
| | | | | | | 210/137 |
| 7,632,410 | B2 | | 12/2009 | Heiss | | |
| 2005/0121388 | A1 | * | 6/2005 | Wood | ..................... | B01D 61/10 |
| | | | | | | 210/636 |
| 2005/0139530 | A1 | | 6/2005 | Heiss | | |
| 2009/0200238 | A1 | * | 8/2009 | Astle | ........................ | C02F 1/441 |
| | | | | | | 210/652 |
| 2011/0180465 | A1 | * | 7/2011 | Richetti | ................ | B01D 61/04 |
| | | | | | | 210/110 |
| 2016/0257576 | A1 | * | 9/2016 | Hoz | ........................ | C02F 1/442 |
| 2018/0154310 | A1 | * | 6/2018 | Huang | ................ | B01D 61/025 |
| 2018/0162761 | A1 | * | 6/2018 | Zhang | .................... | C02F 9/005 |

\* cited by examiner

*Primary Examiner* — Krishnan S Menon
(74) *Attorney, Agent, or Firm* — The Plus IP Firm; Derek Fahey (57) ABSTRACT

A system for reducing water pump cycling and TDS creep when producing purified water is disclosed. The system includes a central control unit for receiving signals from a processing reservoir water level sensor and controlling a purified water valve and a waste water valve. The purified water valve is configured to divert at least a purified water flow through a purified water conduit to the processing reservoir and the waste water valve is configured to divert waste water flow through a waste water conduit to the processing reservoir to maintain the pump in a pumping condition such that the amount of processing water is at least as great as a processing water threshold thereby reducing cycling of the pump and TDS creep.

20 Claims, 4 Drawing Sheets

SYSTEM AND METHOD FOR REDUCING WATER PUMP CYCLING AND TDS CREEP WHEN PRODUCING PURIFIED WATER

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of water purification, and more specifically to the field of reverse osmosis water systems.

BACKGROUND

Reverse osmosis is a process for removing dissolved mineral salts, organic molecules and certain other impurities by forcing water under pressure to pass through a semi-permeable membrane. The reverse osmosis process reverses the natural osmotic effect in which fluids with a low concentration of dissolved solids pass through a membrane into an area of higher concentration. With reverse osmosis, water is made to pass from a state of high concentration to a state of low concentration. Reverse osmosis is used to produce highly purified water for drinking water systems, industrial boilers, food and beverage processing, cosmetics, pharmaceutical production, seawater desalination, and many other applications.

Generally speaking, there are two types of reverse osmosis system passes for a reverse osmosis water purification system, single-pass or double-pass. A pass itself is synonymous to a single, standalone reverse osmosis system. This means that a double-pass system operates as two separate systems in series, and therefore produces more highly purified water than a single-pass system does. The terms first pass system or single pass reverse osmosis system means the first system water purification system in a double-pass system. The term second pass system or second reverse osmosis system means the second water purification system in a double pass system.

With this in mind, the difference between a single pass reverse osmosis system and a double pass reverse osmosis system is that with double pass reverse osmosis, the permeate from the first pass becomes the feed water to the second pass (or second reverse osmosis) which ends up producing a much higher quality permeate because it has essentially gone through two reverse osmosis systems. In between the first pass system and second pass system, there should be a break tank or processing tank where permeate water of the first pass reverse osmosis is stored and fed into the second pass reverse osmosis for further purification. To force water through a semi-permeable membrane, pressure must be applied to overcome the water's osmotic back pressure and permeate back pressure. Normally, pumps are required to push the water through the reverse osmosis system. Pumps must be sized to meet the required operating pressure and flow rate of the reverse osmosis system and they constitute the largest energy consuming component in a reverse osmosis system.

As discussed above, a common issue with double-pass reverse osmosis systems is excessive pump cycling. A cycle refers to the pump run time. A cycle starts when the pump starts, and a cycle is completed when the pump stops. Pump starts and stops are determined by the level of water in the intermediate tank of the reverse osmosis system. The pump turns on when the tank is full. The pump supplies water to the reverse osmosis system until a predetermined low tank level is reached at which point the pump turns off. As a result, the pump is subjected to excessive wear and tear, mechanical damage, and significant power consumption.

An issue with double-pass reverse osmosis systems is that by the time the permeate from the first pass becomes the feed water to the second pass, the water in the break tank may be significantly low, causing excessive pump cycling. Stated differently, one of the issues of double-pass reverse osmosis systems is that the first pass permeate water produced by the first pass may not be enough water to accommodate the consumption rate of the second pass.

Another problem is that because the double pass system is a system in series, there may be times when the first pass produces more water than the second pass is able to consume because of scaling, improper operation, wear etc., which may cause excessive pressure and damage to the system. A cycle refers to the pump run time. A cycle starts when the pump starts, and a cycle is completed when the pump stops. Pump starts and pump stops are typically determined by the level of water available in the processing tank. The pump for the second pass supplies water to the second pass reverse osmosis system until a predetermined minimum level of water is reached, at which point the pump for the second pass turns off. As a result, the pump for the second pass is subjected to excessive wear and tear, mechanical damage, and significant power consumption. The starting and stopping of the pump of the second pass is due to not enough water being produced by the first pass to accommodate the consumption rate of the second pass.

Additionally, the system is affected by a phenomenon called "TDS Creep." TDS stands for "total dissolved solids" and is the term used to describe the inorganic salts and small amounts of organic matter present in water. TDS creep causes a rise in product water TDS when reverse osmosis systems are not in use. This rise in TDS occurs because concentrated water rests on the feed side of the membrane element while low mineral content water rests on the permeate side of the membrane element. When no pressure is applied to the membrane element, these concentrations will slowly tend to reach equilibrium through the natural processes of diffusion and osmosis. As a result, a high TDS reading indicates that more dissolved solids are present in the water at system start-up.

Water hammer or water hammering is another common issue that occurs when the overall pressure of a fresh water source is too high. Water hammer is a pressure surge or wave caused when water in motion is forced to stop or change direction suddenly; a momentum change. This phenomenon commonly occurs when a valve closes suddenly at an end of a pipeline system, and a pressure wave propagates in the pipe. The pressure wave creates a dramatic effect, which, if allowed to continue, can result in damage to the pipe, seals and other apparatus. In the case of an isolated occurrence, the pressure wave produces a violent slamming that physically moves the pipe and causes a loud banging noise. In the case of a resonance, the passage of a pressure wave back and forth results in a very loud low-frequency buzzing sound. It should be noted that the pipe is not the only component affected by the water hammer phenomenon. Pumps, valves, and pipe fittings are also susceptible to damage from water hammer.

Therefore, a need exists to improve over the prior art and more particularly, for a better system to reduce water pump cycling, lessen TDS creep and water hammering when producing purified water.

SUMMARY

A system and method for reducing water pump cycling and TDS creep when producing purified water is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for reducing water pump cycling and TDS creep when producing purified water is disclosed. The system includes a feed water source, a processing reservoir for storing processing water, and a feed water conduit providing fluid communication from the feed water source to the processing reservoir. A pressure vessel assembly is in fluid communication with the processing reservoir and has a reverse osmosis membrane for producing purified water from processing water received from the processing reservoir. The system also includes a pump for forcing processing water from the processing reservoir though the reverse osmosis membrane to produce purified water, and a processing reservoir water level sensor for determining an amount of processing water in the processing reservoir.

A purified water reservoir is in fluid communication with the pressure vessel assembly for receiving purified water from the pressure vessel assembly. A purified water conduit provides fluid communication from the pressure vessel assembly to the purified water reservoir, and a second purified water conduit downstream from the pressure vessel assembly provides fluid communication between the purified water conduit back to the processing reservoir. A purified water valve is adapted for diverting a purified water flow through the second purified water conduit back to the processing reservoir.

A waste water conduit provides fluid communication from the pressure vessel assembly to an egress of the system, and a second waste water conduit downstream from the pressure vessel assembly provides fluid communication from the waste water conduit to the processing reservoir. A waste water valve is adapted for diverting a waste water flow through from the second waste water conduit to the processing reservoir.

The system also includes a central control unit for receiving signals from the processing reservoir water level sensor and controlling the purified water valve and waste water valve. The purified water valve is configured to divert at least purified water flow through the second purified water conduit to the processing reservoir and the waste water valve is configured to divert waste water flow through the second waste water conduit to the processing reservoir to maintain the pump in a pumping condition such that the amount of processing water is at least as great as a processing water threshold thereby reducing cycling of the pump and TDS creep.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing system and method for reducing water pump cycling and TDS creep when producing purified water. The system improves upon the prior art by providing a waste water valve that is configured to direct waste water flow through the second waste water conduit to the processing tank if the amount of processing water is less than a processing water threshold to reduce water pump cycling and TDS creep.

The system also improves upon the prior art by providing a permeate water valve that is configured to direct permeate water flow through the second permeate water conduit to the processing tank if the amount of processing water is less than a processing water threshold to reduce water pump cycling and TDS creep. As used herein, the term "reduce" means to decrease or completely eliminate water pump cycling and TDS creep. The system also improves upon the prior art by providing a vent from the processing reservoir to the egress of the system if the first pass produces more water than second pass is consuming in order to alleviate unwanted pressure within the system.

The system also improves upon the prior art by reducing water hammer at the fresh water source. Water hammer is a pressure surge or wave caused when water in motion is forced to stop or change direction suddenly; a momentum change. This phenomenon commonly occurs when a valve closes suddenly at an end of a pipeline system, and a pressure wave propagates in the pipe. The pressure wave creates a dramatic effect, which, if allowed to continue, can result in damage to the pipes, valves, and pumps. In the case of an isolated occurrence, the pressure wave produces a violent slamming that physically moves the pipe and causes a loud banging noise. In the case of a resonance, the passage of a pressure wave back and forth results in a very loud low-frequency buzzing sound. To prevent this from occurring, the system includes a central control unit that is configured for controlling the fresh water flow from the fresh water source by sending signals to the adjustable fresh water flow valve such that the fresh water flow maintains the amount of processing water within the processing reservoir at a level that satisfies the processing water threshold thereby reducing the frequency at which the adjustable fresh water flow valve moves between a fully open and a fully closed position.

Figure 1:
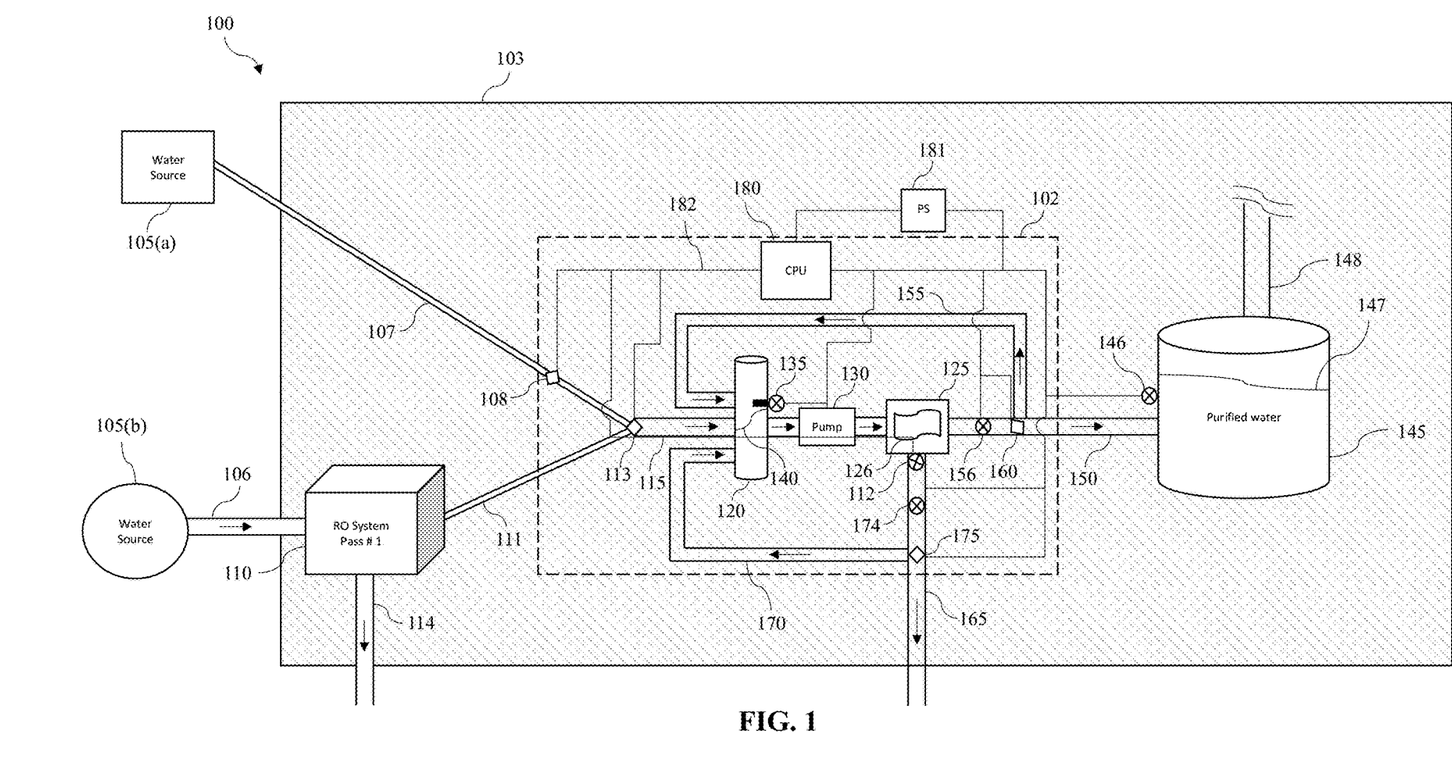
FIG. 1 is a block diagram illustrating the main components of a system for reducing water pump cycling and TDS creep when producing purified water, according to an example embodiment of the present invention.

Referring now to the Figures. FIG. 1 is a block diagram illustrating the main components of a system 100 for reducing water pump cycling and TDS creep when producing purified water, according to an example embodiment of the present invention. Although the examples given herein describe the system relative to a boat, those of skill in the art will appreciate that the invention may be adapted for use in any substantially enclosed environment, including, but not limited to, homes, residential buildings, commercial buildings, hotels, cars, buses, trains, airplanes, cruise ships, educational facilities, offices, and government buildings.

As discussed above, a common issue with double-pass reverse osmosis systems is excessive pump cycling. A cycle refers to the pump run time. A cycle starts when the pump starts, and a cycle is completed when the pump stops. Pump starts and stops are determined by the level of water in the intermediate tank of the reverse osmosis system. The pump turns on when the tank is full. The pump supplies water to the reverse osmosis system until a predetermined low tank level is reached at which point the pump turns off. As a result, the pump is subjected to excessive wear and tear, mechanical damage, and significant power consumption.

An issue with double-pass reverse osmosis systems is that by the time the permeate from the first pass becomes the feed water to the second pass, the water in the processing reservoir may be significantly low, causing excessive pump cycling. Stated differently, one of the issues of double-pass reverse osmosis systems is that the first pass permeate water produced by the first pass may not be enough water to accommodate the consumption rate of the second pass.

Also, another problem is that because the double pass system is a system in series there may be times when the first pass produces more water than the second pass is able to consume because of scaling, improper operation, wear etc., which may cause excessive pressure and damage to the system. Monitoring and controlling the amount of water in the processing tank between the first pass system and second pass system to not cause starting and stopping of the pump that draws water in the second pass system and unwanted pressure on the components of the system are significant issues in double pass systems.

A cycle refers to the pump run time. A cycle starts when the pump starts, and a cycle is completed when the pump stops. Pump starts and stops are typically determined by the level of water available in the processing tank. The pump for the second pass supplies water to the second pass reverse osmosis system until a predetermined minimum level of water is reached at which point the pump for the second pass turns off. As a result, the pump for the second pass is subjected to excessive wear and tear, mechanical damage, and significant power consumption. The starting and stopping of the pump of the second pass, which is caused by there not being enough water produced by the first pass to accommodate the consumption rate of the second pass.

Another common issue with reverse osmosis systems is a phenomenon called "TDS Creep." TDS stands for "total dissolved solids" and is the term used to describe the inorganic salts and small amounts of organic matter present in water. TDS creep causes a rise in product water TDS when reverse osmosis systems are not in use. This rise in TDS occurs because concentrated water rests on the feed side of the membrane element while low mineral content water (low TDS) rests on the permeate side of the membrane element. When no pressure is applied to the membrane element, these concentrations will slowly tend to reach equilibrium through the natural processes of diffusion and osmosis. As a result, a high TDS reading indicates that more dissolved minerals are present in the water at system startup. The system may be in fluid communication with multiple feed water sources. The feed water source supplies the water that is fed into the system to be treated. In the present embodiment, the system may be incorporated onto a boat, vessel, or any other housing that is proximate to a body of water or other feed water source.

In one embodiment, as illustrated in FIG. 1, the system is in fluid communication with two feed water sources 105(*a*), 105(*b*). In one embodiment, the first feed water source 105(*a*) is a fresh water source. A fresh water source is any water source except seawater and brackish water and is generally characterized by having low concentrations of dissolved salts and other total dissolved solids. Fresh water sources may include lakes, rivers, streams, as well as dockside connections to municipal or industrial water sources. In one embodiment, the second feed water source 105(*b*) is a body of water (e.g., lake, ocean, sea, river, etc.).

The system includes a pair of conduits 107, 111 that are configured to provide fluid communication into the ingress of the system. It is understood that when the system 100 is installed on a boat or floating vessel that is connected to the first feed water source 105(*a*), then the system may be configured so that water is drawn from the first feed water source 105(*a*). On the other hand, if the vessel is at sea and not connected to the first feed water source 105(*a*), then the system may draw water from the second feed water source 105(*b*).

Each feed water source 105(*a*), 105(*b*) is in fluid communication, via a feed water conduit 115, with an ingress of a processing reservoir 120 configured for storing processing water. The feed water conduit is used to transfer water from the feed water source 105(*a*), 105(*b*) into the processing reservoir. Processing water is defined as the water that is stored inside the processing reservoir. The feed water conduit and the processing reservoir are located inside a housing represented by dashed line 102. In certain embodiments, the first pass system may be included within the same housing 103 as the second pass system. In other embodiments, the first pass system and second pass system may be in separate housings.

Each of the housings may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The housing may be formed from a single piece or from several individual pieces joined or coupled together. The components of the housing may be manufactured from a variety of different processes, including an extrusion process, a mold, welding, shearing, punching welding, folding etc. It is understood that conduits may be made from a variety of different materials such as metal, polymer-based materials, alloys etc. However, other materials may be within the spirit and scope of the present invention. The size and shape of the conduits may be adjusted depending on the application.

The system also includes a processing reservoir water level sensor 135 for determining an amount of processing water 140 in the processing reservoir. As used herein, the term "sensor" refers to a single sensor or a plurality of sensors. The processing reservoir water level sensor is adapted for monitoring the amount of processing water in the processing reservoir and generating corresponding processing reservoir water level sensor data. The processing reservoir water level sensor is configured for sending a signal associated with the processing reservoir water data to the central control unit. In the present embodiment, the processing reservoir water level sensor is an electric liquid level sensor that is conductively and communicatively coupled to a central control unit and a power source (further identified below). It should be appreciated that additional sensors such as accelerometers, water flow sensors, temperature sensors, conductance measurement devices, barometers, or pressure sensors, may be located at various points throughout the system, and such variations are within the spirit and scope of the claimed invention.

The system may also be configured to fit within a housing. The housing may be comprised of material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The housing may be formed from a single piece or from several individual pieces joined or coupled together. The components of the hosing may be manufactured from a variety of different processes including an extrusion process, a mold, welding, shearing, punching welding, folding etc.

The present invention is able to improve over the prior art by providing an adjustable fresh water flow valve 108 for controlling a fresh water flow from the feed water source 105(*a*) to the processing reservoir. The adjustable fresh water flow valve is located along a first feed water supply line 107 and is conductively and communicatively coupled with the central control unit and power source. The first feed water supply line provides fluid communication from the feed water source 105(*a*) to the feed water conduit. In the present embodiment, the adjustable fresh water flow valve is an electrically actuated valve located inside the housing. The electrically actuated valve uses a plunger to open and close an orifice, which either prevents or allows the flow of water. The electrically actuated valve maintains the amount of processing water within the processing reservoir at a level that satisfies the processing water threshold thereby reducing a frequency at which the adjustable fresh water flow valve moves between a fully open and a fully closed position and to reduce water hammer at the fresh water source.

As discussed above, water hammer is a pressure surge or wave caused when water in motion is forced to stop or change direction suddenly. This phenomenon commonly occurs when a valve closes suddenly at an end of a pipeline system, and a pressure wave propagates in the pipe. It should be appreciated that other valves, such as ball and butterfly valves, solenoid, float valves, or check valves, may also be used to accurately and safely control the fresh water flow. The adjustable fresh water flow valve may be comprised of materials such as galvanized steel or iron, copper, polybutylene, unplasticized polyvinylchloride (PVC), chlorinated polyvinylchloride (CPVC) and polyethylene (PE) to increase corrosion resistance to specific environments, enhance oxidation resistance, and impart special characteristics.

The feed water source is at least one of a second water purification system and a water filtration system 110. In the present embodiment, the water purification system and the water filtration system are situated externally from the housing. A water purification system removes 90-99.9% of all contaminants in water, including bacteria and viruses. A water filtration system removes sediment and unwanted substances, such as chemicals and toxins, to improve the taste and odor of water. Additionally, in other embodiments, pre-filters may be used to pretreat the feed water supply before it enters a single-pass system or a double-pass system. Pretreatment of the feed water entering the system can minimize fouling of the membrane and thereby increase the overall recovery rate of the system. The feed water, depending on its source, may contain various concentrations of suspended solids and dissolved matter, including both organic and inorganic substances. Suspended particles can settle on the membrane surface, blocking feed channels and increasing friction losses across the system. Dissolved solids can precipitate out of the solution and cause scaling. Pretreated water entering the system can reduce the amount of work of the pump, thus reducing energy consumption.

Depending on the feed water source a boat is using at any given time, the system may operate as a single-pass system or a double-pass system if necessary, depending on vessel location, and/or to produce higher quality water. As mentioned above, there are two types of reverse osmosis system passes for a reverse osmosis water purification system, single-pass or double-pass. A pass itself is synonymous to a single, standalone reverse osmosis system. This means that a double-pass system operates as two systems, and therefore produces more highly purified water than a single-pass system does. For example, a single-pass system would be used if the feed water source is a fresh water source because it would produce purified water with low concentrations of suspended particles and dissolved salts.

However, for some applications, the single-pass system may not be capable of producing permeate water of a required salinity. For example, a double-pass system would be used if the feed water source is a saline water source. Saline water, or salt water, is water from a sea or ocean. Saline water is generally characterized by having high concentrations of dissolved salts. Likewise, a double-pass system would be used if the feed water source is a brackish water source. Brackish water sources include estuaries, mangroves, and swamps. Brackish water is characterized by having more salinity than freshwater, but not as much as seawater.

The system may be a single-pass system, or a double-pass system to produce more purified water from the feed water source. The feed water source 105(*a*) of the single pass system may be from a city water supply line, dock water, or any other water source or supply line. In a double-pass system, the feed water source 105(*b*) may from a body of water that is saline, brackish, fresh, or any combination thereof, that is in fluid communication with a first pass system 110, which is in fluid communication with the processing tank or reservoir 120.

Each water purification and filtration system (either the first pass system or the second pass system) produces two streams of water, a purified water stream and a waste water stream. Purified water, also known in the art as permeate or product water, is a portion of the feed water that has been demineralized or deionized. Waste water, also known in the art as concentrate, brine, or reject water, is a portion of the feed water that contains the impurities that have been filtered out of the purified water.

When in the double pass configuration, water from the feed water source 105(*b*) moves via a conduit 106, and into the first pass reverse osmosis system 110. A feed water supply line 111 provides the purified water from the first pass system 110 system to the feed water conduit 115. The feed water supply line 111 extends from the water purification and filtration system situated outside of the housing 102, to the feed water conduit situated inside the housing. In other embodiments, it is understood that the housing 103 may contain both the first pass system 110 and the second pass system such that the first pass system and second pass system are contained in a single housing.

A water flow diversion valve 113 provides alternate means for providing feed water to the processing reservoir from either the water source 106, or the first pass system 110. In other words, the diversion valve may convert the system from a single pass system to a double pass system, and vice versa. The water flow diversion valve is located along the feed water conduit line 111 and is conductively and communicatively coupled with the central control unit and power source.

In other embodiments, the water flow diversion valve 113 allows water to flow from the first pass system 110 to the processing reservoir when activated with voltage. Alternatively, a conduit (not illustrated) may allow water to flow from conduit 111 to the puri-fied processing water reservoir 145. This may be necessary in certain embodiments where a second pass is unnecessary or when energy consumption is more important than having a second pass system purify water. A waste water drain line 114 provides fluid communication from the water purification and filtration system or first pass system 110 to an egress of the system. The waste water drain line is used to dispose of the waste water containing the impurities and contaminants that have been filtered out by the water purification and filtration system.

A vent or drain (not illustrated) provides fluid communication from the processing reservoir to an egress of the system. In order to reduce excess pressure within the system, the vent or drain line (not illustrated) may be used when to divert water out of the processing reservoir if the amount of water in the processing reservoir is greater that a maximum threshold of water as determined by a sensor 135, which may occur if the second pass reverse osmosis system is not purifying water at a sufficient rate due to scaling or other issues Sensor 135 may be a liquid level sensor, however other sensors may be used and are within the spirit and scope of the present invention.

The system further includes a pressure vessel assembly 125 in fluid communication with the processing reservoir 120 and having a reverse osmosis membrane 126 for producing purified water from processing water received from an egress of the processing reservoir. A pressure vessel is a sealed tubular device which contains the reverse osmosis membrane. A reverse osmosis membrane is a semi-permeable membrane that selectively allows pure water to pass through the membrane while rejecting larger molecules such as dissolved salts and other impurities such as bacteria. Reverse osmosis membranes are designed for resistance to chemical and microbial damage, mechanical and structural stability over specified operating periods, and desired filtration requirements. Reverse osmosis membranes are made from a thin, porous material constructed of organic polymer (e.g. cellulose acetate, polyamide and charged polysulfone). The combination of reverse osmosis membrane properties and configurations influence the effectiveness at removing impurities and passing the maximum amount of purified water through the system. Depending on the feed water quality and operating conditions, reverse osmosis membranes are changed out and disposed of several times during a system's lifetime.

The system includes a pump 130 for the second pass for drawing processing water from the processing reservoir through the reverse osmosis membrane to produce purified water. The pump draws water needed from the processing reservoir and supplies the pressure needed to push the processing water through the reverse osmosis membrane, even as the reverse osmosis membrane rejects the passage of dissolved salts and other impurities such as bacteria. In the present embodiment, the pump is located inside of the housing and is conductively and communicatively coupled with the central control unit and power source. However, it is understood that the pump also may be also be located in other locations that are within the spirit and scope of the present invention.

A purified water reservoir 145 is in fluid communication with the pressure vessel assembly and for receiving purified water from the pressure vessel assembly. The purified water reservoir comprises a large vessel that can support a large quantity of purified water for longer periods of time without spoilage and leakage. The exact size, shape and design of the purified water reservoir may take on different forms depending on the given application of the system. In the present embodiment, the purified water reservoir is situated externally from the housing and includes a purified water level sensor 146 for determining an amount of purified water 147 in the purified water reservoir. The purified water level sensor is an electric liquid level sensor that is conductively and communicatively coupled to the central control unit and power source. The purified water level sensor is adapted for monitoring the amount of purified water in the purified water reservoir and generating corresponding purified water reservoir level sensor data. The purified water level sensor is configured for sending a signal associated with the purified water reservoir data to the central control unit. In one embodiment, after the purified water leaves the purified water reservoir, but before going to the faucet 148, the purified water passes through an activate carbon post-filter or system to remove any remaining tastes or potential odors from the purified water. Additional post-treatment processes often include disinfection using suitable biocides, pH adjustment, and possibly the addition of suitable corrosion inhibitors.

A purified water conduit 150 is configured for providing fluid communication from the pressure vessel assembly to the purified water reservoir. In the present embodiment, the purified water conduit extends from the pressure vessel assembly situated inside the housing to the purified water reservoir situated outside the housing. The purified water conduit includes a water flow sensor 156 located inside the housing and is conductively and communicatively coupled with the central control unit and power source. The water flow sensor is adapted for monitoring the flow of purified water from the pressure vessel assembly to the purified water reservoir and generating corresponding water flow sensor data. The water flow sensor is configured for sending a signal associated with the water flow sensor data to the central control unit. A second purified water conduit 155 downstream from the pressure vessel assembly is configured for providing fluid communication between the purified water conduit back to the processing reservoir. In the present embodiment, the second purified water conduit is situated inside the housing and extends from the purified water conduit to the purified water reservoir.

A purified water valve 160 is configured to divert at least purified water flow through the second purified water conduit to the processing reservoir to maintain the pump in a pumping condition such that the amount of processing water is at least as great as a processing water threshold thereby reducing cycling of the pump and TDS creep. As explained above, the term reducing may mean decreasing or eliminating. The purified water flow valve is located along the purified water conduit and is conductively and communicatively coupled with the central control unit and power source. In the present embodiment, the purified water valve is a solenoid valve located inside the housing that diverts water from the purified water conduit to the processing reservoir when activated with voltage and allows water to flow to the purified water reservoir when no voltage is present to activate the solenoid. The purified water valve and the second purified water conduit improve over the prior art because they allow for the continuous and uninterrupted operation of the pump whenever there is less feed water flow than the system consumes. As a result, the pump is not subjected to constant starts and stops that are prone to cause excessive wear and tear, mechanical damage, and significant power consumption. Additionally, due to the continuous and uninterrupted pressure applied to the reverse osmosis membrane, the effects of TDS creep are eliminated.

The system also includes a waste water conduit 165 for providing fluid communication from the pressure vessel assembly to an egress of the system. In the present embodiment, the waste water conduit extends from the pressure vessel assembly situated inside the housing to an egress of the system situated outside the housing. The waste water conduit includes a water flow sensor 174 located inside the housing and is conductively and communicatively coupled with the central control unit and power source. The water flow sensor is adapted for monitoring the flow of waste water from the pressure vessel assembly to an egress of the system and generating corresponding water flow sensor data. The water flow sensor is configured for sending a signal associated with the water flow sensor data to the central control unit. A second waste water conduit 170 downstream from the pressure vessel assembly is configured for providing fluid communication from the waste water conduit back to the processing reservoir. In the present embodiment, the second waste water conduit is situated inside the housing and extends from the waste water conduit to the processing reservoir.

The system also includes a central control unit 180 in electrical communication with the processing reservoir water level sensor 181, the purified water valve, the waste water valve, and the adjustable fresh water flow valve. The central control unit is configured for controlling the fresh water flow from the fresh water source by sending signals to the adjustable fresh water flow valve such that the fresh water flow maintains the amount of processing water within the processing reservoir at a level that satisfies the processing water threshold thereby reducing a frequency at which the adjustable fresh water flow valve moves between a fully open and a fully closed position and to reduce water hammering at the fresh water source.

The system also includes a central control unit 180 in electrical communication with the processing reservoir water level sensor, the purified water valve, the waste water valve, and the adjustable fresh water flow valve. The central control unit is configured for controlling the fresh water flow from the fresh water source by sending signals to the adjustable fresh water flow valve such that the fresh water flow maintains the amount of processing water within the processing reservoir at a level that satisfies the processing water threshold thereby reducing a frequency at which the adjustable fresh water flow valve moves between a fully open and a fully closed position and to reduce water hammering at the fresh water source.

The central control unit may be conductively and communicatively coupled, via a communication bus, to allow communication and conductive coupling to a power source, processing reservoir water level sensor, purified water valve, waste water valve, and adjustable fresh water flow valve. Such communication bus and conductive couplings are well known to those skilled in the art.

The central control unit comprises the control circuit that provides conduction paths or conductors 182 to direct current between the various electrical components of the system, including the power source, processing reservoir water level sensor, purified water valve, waste water valve, and adjustable fresh water flow valve. Such conductors are well known to those skilled in the present invention. The central control unit comprises circuit boards as is conventional in the art that provides mounting for components used with the circuitry involved in the present invention. The central control unit comprises a processor or micro-processor having the necessary circuitry and components for performing its necessary functions. The central control unit may include volatile memory, such as RMA, or non-volatile memory, such as ROM. EPROM or flash memory.

If the feed water source water is a body of water such as an ocean, the system may be configured to receive the fluid into at least one of a purification system and water filtration system. The feed water source is in fluid communication, via the feed water conduit 115, with an ingress of the processing reservoir 120 configured for storing processing water. As mentioned above valve 113 may divert the flow of water so that the system may move between a single pass system and a double pass system depending on the source of the feed water into the processing reservoir. As mentioned above, additional valves or the same valve 113 may be configured to bypass the second pass system altogether and move water through conduit (not illustrated) and to purified water reservoir 145.

If the feed water source water is a body of water such as an ocean, the system may be configured to receive the fluid into at least one of a purification system and water filtration system. The feed water source is in fluid communication, via the feed water conduit 115, with an ingress of the processing reservoir 120 configured for storing processing water. As mentioned above valve 113 may divert the flow of water so that the system may move between a single pass system and a double pass system depending on the source of the feed water into the processing reservoir. As mentioned above, additional valves or the same valve 113 may be configured to bypass the second pass system altogether and move water through conduit 166 and to purified water reservoir 145.

Figure 2:
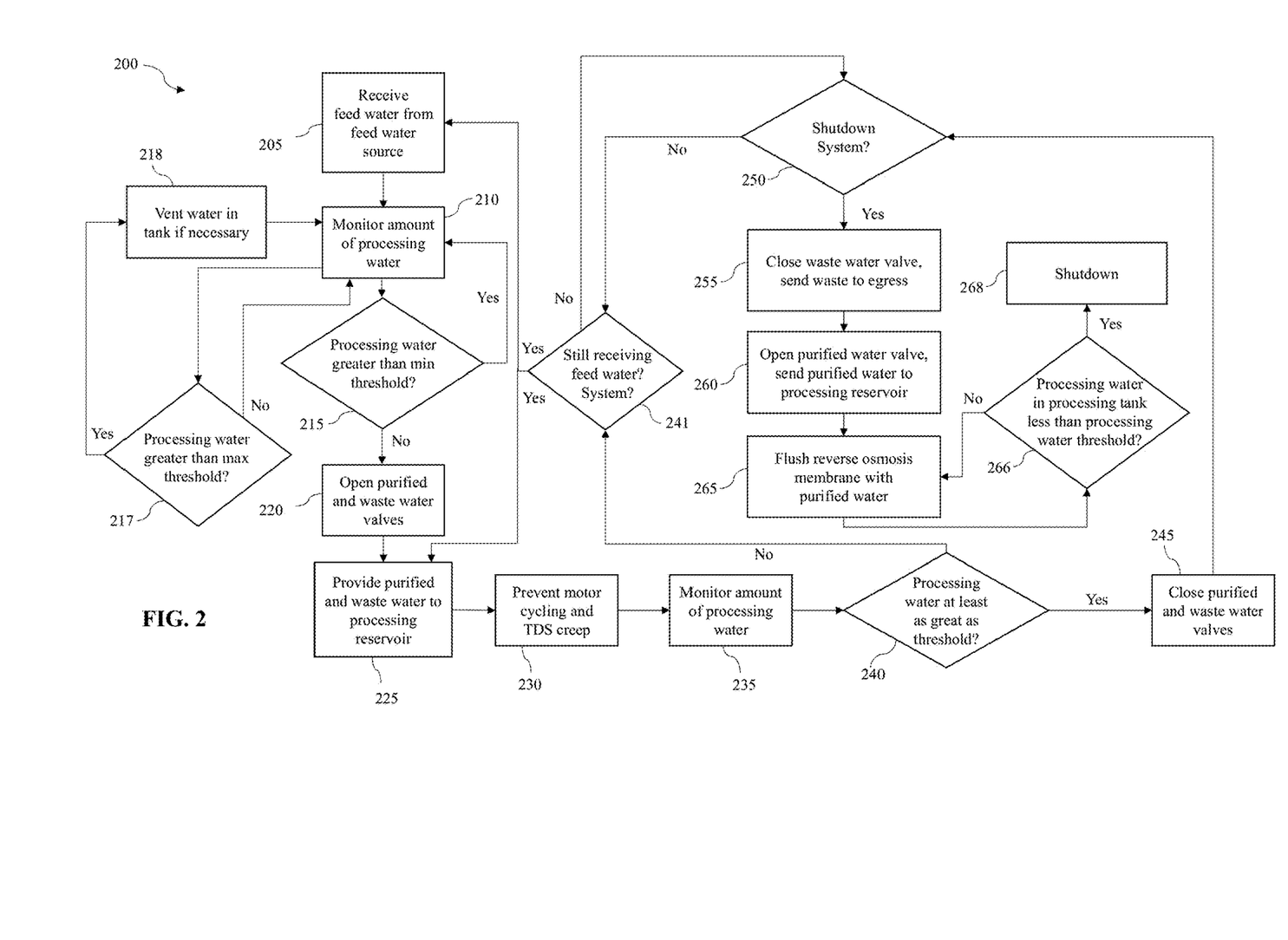
FIG. 2 is a flowchart describing the steps of the process performed by the system, according to an example embodiment of the present invention.

In step 210, the central control unit monitors the amount of processing water in the processing reservoir through the processing reservoir water level sensor 135. The processing reservoir water level sensor is adapted for monitoring the amount of processing water in the processing reservoir and generating corresponding processing reservoir water level sensor data. The processing reservoir water level sensor is configured for sending a signal associated with the processing reservoir water data to the central control unit. In one embodiment, the processing reservoir water level sensor is an electric liquid level sensor that is conductively and communicatively coupled to the central control unit and power source.

Alternatively, if in step 215, the amount of processing water within the processing reservoir is below the processing water threshold, the process proceeds to step 220, opening the purified water valve and the waste water valve. In step 220, the central control unit diverts the purified water valve 160 and the waste water valve 175. The purified water valve is configured to divert at least purified water flow through the second purified water conduit to the processing reservoir to maintain the pump 130 in a pumping condition such that the amount of processing water is at least as great as a processing water threshold thereby reducing cycling of the pump and TDS creep. In one embodiment, the purified water valve is a solenoid that diverts water from the purified water conduit to the processing reservoir when activated with voltage.

Alternatively, if in step 215, the amount of processing water within the processing reservoir is below the processing water threshold, the process proceeds to step 220. In step 220, the central control unit diverts the purified water valve 160 and the waste water valve 175. The purified water valve is configured to divert at least purified water flow through the second purified water conduit to the processing reservoir to maintain the pump 130 in a pumping condition such that the amount of processing water is at least as great as a processing water threshold thereby reducing cycling of the pump and TDS creep. In one embodiment, the purified water valve is a solenoid that diverts water from the purified water conduit to the processing reservoir when activated with voltage.

Optionally, in step 217, the central control unit is also configured to determine whether the amount of processing water within the processing reservoir is at greater than a maximum processing water threshold to prevent unwanted excess pressure on components of the system. If the amount of water in the processing tank is greater than maximum processing water threshold, then the water is vented in step 218 and 112 automatic pressure regulator valve will open to increase waste water via conduit 165 to an egress of the system. It is understood that in venting step 218 the system will continue to monitor the amount of water in the processing tank and close the 112 automatic pressure regulator valve after the central processing unit determines that water in the processing tank is between the processing water maximum threshold level and processing water minimum threshold.

Optionally, in step 217, the central control unit is also configured to determine whether the amount of processing water within the processing reservoir is at greater than a maximum processing water threshold to prevent unwanted excess pressure on components of the system. If the amount of water in the processing tank is greater than maximum processing water threshold, then the process moves to step 218 and 112 automatic pressure regulator valve will open to increase waste water via conduit 165 to an egress of the system. It is understood that in step 218 the system will continue to monitor the amount of water in the processing tank and close the 112 automatic pressure regulator valve after the central processing unit determines that water in the processing tank is between the processing water maximum threshold level and processing water minimum threshold.

In step 225, the purified water and the waste water recombine in the processing reservoir to allow the system to run continuously despite there being a lesser feed water flow than the system requires. In step 230, the purified water and the waste water in the processing reservoir improve over the prior art because it allows for the continuous and uninterrupted operation of the pump whenever there is less feed water flow than the system consumes. As a result, the pump is not subjected to constant starts and stops that are prone to cause excessive wear and tear, mechanical damage, and significant power consumption. Additionally, due to the continuous and uninterrupted pressure applied to the reverse osmosis membrane, the effects of TDS creep are reduced or eliminated. In step 235, the central control unit monitors the amount of processing water in the processing reservoir through the processing reservoir water level sensor.

In step 240, the central control unit 180 determines whether the amount of processing water within the processing reservoir is at least as great as the processing water threshold. If the amount of processing water within the processing reservoir is at least as great as the processing water threshold, then the process proceeds to step 241. Alternatively, if in step 240, the amount of processing water within the processing reservoir is below the processing water threshold, the process proceeds back to step 245.

Next, in step 241, the system is configured to determine if the feed water is still being received from water source 105(*a*) or 105(*b*). The central processing may make this determination sensors through the system including sensor 135, as well as other sensors placed through the system. If the central processing unit determines that feed water is still being received from either of the water sources, then the system may move to step 225 if the purified and waste water valves have already been opened.

On the other hand, if the central control or processing unit 180 determines that the system is not still receiving feed water from one of the water sources, then the system may move to step 250 and begin the shut down and flush process so that components of the system are not damaged due to insufficient processing water. Additionally, it is also understood that if the amount of water in the processing reservoir is greater than a maximum threshold as determined by sensor 135, then the system may be configured to divert water using valves (such as 113) 112 automatic pressure regulator valve will open to increase waste water via conduit 165 to an egress of the system to prevent unwanted pressure.

In step 245, the central control unit 180 closes the purified water valve 160 and the waste water valve 175 because the amount of processing water within the processing reservoir is at least as great as the processing water threshold. In one embodiment, the purified water valve is a solenoid or other valve that allows water to flow from the pressure vessel assembly to the purified water reservoir when no voltage is present. Similarly, in one embodiment, the waste water valve is a solenoid that allows water to flow from the pressure vessel assembly to an egress of the system when no voltage is present to activate the solenoid. However, it is understood that other types of valves may be used and are within the spirit and scope of the present invention.

After step 245, the process moves to step 250. In step 250, the central control unit determines whether a shutdown sequence, which has been pre-programmed or manually initiated in the system, has been activated. If the central control unit determines that a shutdown sequence has been pre-programmed or manually initiated in the system has been activated, then the process proceeds to step 255. Alternatively, if in step 250, the central control unit determines that a shutdown sequence has not been pre-programmed or manually activated or initiated in the system, the process moves to step 241 to determine if the system is still receiving feed water into the processing tank from one of the water sources. If the central processing unit 180 determines that the feed water is no longer being fed from the water source to the processing tank, then the system may move to step 250 to determine if to shut down the system. It is understood if feed water is no longer being received from the water source, then that the system may cycle through the flush cycle for a pre-programmed amount of time or for a predetermined amount of time before the system moves to step 268 and shuts down. Alternatively, if processing water is still being received from the water source, then the process may move back to step 205 or step 225.

In step 255, the waste water valve is closed to allow water to flow from the pressure vessel assembly to an egress of the system. Next, in step 260, the purified water valve is opened to divert water from the purified water conduit to the processing reservoir. In step 265, the reverse osmosis membrane is flushed with purified water prior to shut down. Flushing the reverse osmosis membrane with purified water reduces or eliminates the effects of TDS Creep by washing away dissolved salts and impurities from the surface of the reverse osmosis membrane, resulting in better quality water when the system is used after periods of inactivity.

In step 266, the system will continue to monitor if the processing tank has been emptied. If the processing water in the processing tank is not lower than the processing water threshold, then the system will continue to flush the reverse osmosis membrane with purified water. On other hand, if the processing water in the processing tank is less than the processing water threshold then the system will stop flushing the membrane and the pump will stop drawing water and the system will move to step 268 and will shut down.

Figure 3:
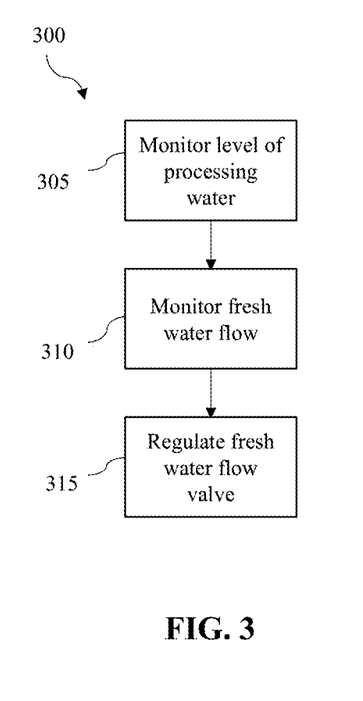
FIG. 3 is a flowchart describing the steps related to the process of controlling fresh water flow, according to an example embodiment of the present invention.

FIG. 3 is a second flowchart describing the steps related to the process 300 of controlling fresh water flow from water source 105(*a*), according to an example embodiment of the present invention. When feed water originates from water source 105(*a*), the water source may be, for example, a city water line, dock water line, etc. In step 305, the feed water source is in fluid communication, via the feed water conduit, with an ingress of the processing reservoir configured for storing processing water. The central control unit monitors the amount of processing water in the processing reservoir through the processing reservoir water level sensor. The processing reservoir water level sensor 135 is adapted for monitoring the amount of processing water in the processing reservoir and generating corresponding processing reservoir water level sensor data. The processing reservoir water level sensor is configured for sending a signal associated with the processing reservoir water data to the central control unit. In one embodiment, the processing reservoir water level sensor is an electric liquid level sensor that is conductively and communicatively coupled to the central control unit and power source.

In step 315, the central control unit 108 is configured for controlling the fresh water flow from the fresh water source by sending signals to the adjustable fresh water flow valve 108. The fresh water flow valve maintains the amount of processing water within the processing reservoir at a level that satisfies the processing water threshold thereby reducing the frequency at which the adjustable fresh water flow valve moves between a fully open and a fully closed position and to reduce water hammering at the fresh water source. The system may also include additional sensors and valves for proper operation, which is within the spirit and scope of the present invention. The central control unit will also monitor the fresh water flow from the fresh water flow valve to maintain the amount of processing water within the processing water is at a level that is less than the maximum processing water threshold.

Figure 4:
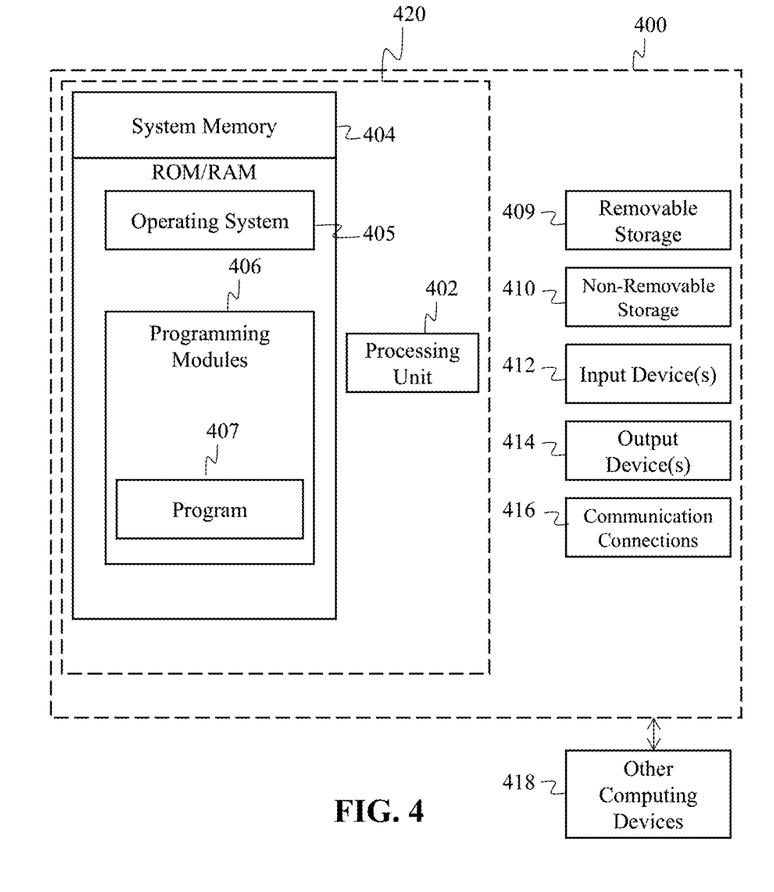
FIG. 4 is a block diagram of a system including an example computing device and other computing devices, according to an example embodiment of the present invention.

FIG. 4 is a block diagram of a system including an example computing device 400 and other computing devices. Consistent with the embodiments described herein, the aforementioned actions performed by the central control unit 180 may be implemented in a computing device, such as the computing device of FIG. 4. Any suitable combination of hardware, software, or firmware may be used to implement the computing device. The aforementioned system, device, and processors are examples and other systems, devices, and processors may comprise the aforementioned computing device. Furthermore, the computing device may comprise an operating environment for the method and process shown in FIGS. 2 and 3.

With reference to FIG. 4, a system consistent with an embodiment of the invention may include a plurality of computing devices, such as computing device 400. In a basic configuration, computing device may include at least one processing unit 402 and a system memory 404. Depending on the configuration and type of computing device, system memory 404 may comprise, but is not limited to volatile (e.g. random-access memory (RAM)), non-volatile (e.g. read-only memory (ROM)), flash memory, or any combination or memory. System memory 404 may also include operating system 405, and one or more programming modules 406 (such as program module 407). Operating system 405, for example, may be suitable for controlling the operation of computing device 400. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of computing device 400. Computing device 400 may also have input device(s) 412 such as a keyboard, a mouse, a pen, a sound input device, a camera, a touch input device, etc. Output device(s) 414 such as a display, audio speakers, or printer, may also be included. The aforementioned devices are only examples, and other devices may be added or substituted.

Computing device 400 may also contain a communication connection 416 that may allow computing device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media, such as a wired network or direct-wired connection, and wireless media, such as acoustic, radio frequency (RF), infrared, and other wireless media. The term computer readable media as used herein may include both, computer storage media and communication media.

As stated above, a number of program modules and data files may be stored in system memory 404, including operating system 405. While executing on processing unit 402, programming modules 406 may perform processes including, for example, one or more of the methods shown in FIGS. 2 and 3. Computing device 400 may also include a graphics processing unit, which supplements the processing capabilities of processor 402 and which may execute programming modules 406, including all or a portion of those processes and methods shown in FIGS. 2 and 3. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for reducing pump cycling and TDS creep when producing purified water, wherein the system comprises:
   a feed water source;
   a processing reservoir for storing processing water;
   a feed water conduit providing fluid in communication from the feed water source to the processing reservoir;
   a pressure vessel assembly in fluid communication with the processing reservoir and having a reverse osmosis membrane for producing purified water from processing water received from the processing reservoir;
   a pump for forcing processing water from the processing reservoir though the reverse osmosis membrane to produce the purified water;
   a processing reservoir water level sensor for determining an amount of the processing water in the processing reservoir;
   a purified water reservoir in fluid communication with the pressure vessel assembly and for receiving the purified water from the pressure vessel assembly;
   a first purified water conduit providing fluid communication from the pressure vessel assembly to the purified water reservoir;

a second purified water conduit downstream from the pressure vessel assembly providing fluid communication between the second purified water conduit back to the processing reservoir;

a purified water valve for diverting a purified water flow through the second purified water conduit back to the processing reservoir;

a first waste water conduit providing fluid communication from the pressure vessel assembly to an egress of the system;

a second waste water conduit downstream from the pressure vessel assembly providing fluid communication from the second waste water conduit to the processing reservoir;

a waste water valve for diverting a waste water flow through from the second waste water conduit to the processing reservoir;

a central control unit for receiving signals, wherein the signals comprise signals from the processing reservoir water level sensor signals from controlling the purified water valve, and signals from the waste water valve; and wherein the purified water valve is configured to divert the purified water flow through the second purified water conduit to the processing reservoir and the waste water valve is configured to divert the waste water flow through the second waste water conduit to the processing reservoir to maintain the pump in a pumping condition such that the amount of processing water is at least as great as a processing water minimum threshold, thereby reducing cycling of the pump and TDS creep.

2. The system of claim 1, wherein the purified water valve is a solenoid that diverts the purified water from the first purified water conduit to the processing reservoir when the amount of progressing water is below the processing water minimum threshold and allows water to flow to the purified water reservoir when the amount of processing water is at least as great as the processing water minimum threshold.

3. The system of claim 1, wherein the waste water valve is a solenoid valve that diverts the waste water from the first waste water conduit to the processing reservoir when the amount of processing water is below the processing water minimum threshold and allows water to exit the system when the amount of processing water is at least as great as the processing water minimum threshold.

4. The system of claim 1, wherein the feed water source is a fresh water source.

5. The system of claim 1, wherein the feed water source is at least one of a second water purification system source and a water filtration system source.

6. The system of claim 1, wherein the processing reservoir water level sensor is an electric liquid level sensor.

7. The system of claim 4, wherein the system further comprises:

an adjustable fresh water flow valve for controlling a fresh water flow from the fresh water source;

wherein the central control unit is configured for receiving signals from the adjustable fresh water flow valve and signals from controlling the adjustable fresh water flow valve; and wherein the central control unit is configured for controlling the fresh water flow from the fresh water source by sending signals to the adjustable fresh water flow valve such that the fresh water flow maintains the amount of processing water within the processing reservoir at a level that satisfies the processing water minimum threshold, thereby reducing a frequency at which the adjustable fresh water flow valve moves between a fully open and a fully closed position and to reduce water hammering at the fresh water source.

8. A control system for reducing pump cycling and TDS creep when producing purified water, wherein the control system comprises:

a feed water source, wherein the feed water source is at least a fresh water source, wherein the feed water source is in fluid communication, via a feed water conduit, with an ingress of a processing reservoir configured for storing processing water;

an adjustable fresh water flow valve for controlling a fresh water flow from the fresh water source to the processing reservoir;

a pressure vessel assembly in fluid communication with the processing reservoir and having a reverse osmosis membrane for producing purified water from the processing water received from an egress of the processing reservoir;

a pump for forcing the processing water from the processing reservoir though the reverse osmosis membrane to produce the purified water;

a purified water reservoir in fluid communication with the pressure vessel assembly and for receiving the purified water from the pressure vessel assembly;

a purified water conduit providing fluid communication from the pressure vessel assembly to the purified water reservoir;

a second purified water conduit downstream from the pressure vessel assembly providing fluid communication between the purified water conduit back to the processing reservoir;

a purified water valve for diverting a purified water flow through the second purified water conduit back to the processing reservoir;

a first waste water conduit providing fluid communication from the pressure vessel assembly to an egress of the system;

a second waste water conduit downstream from the pressure vessel assembly providing fluid communication from the second waste water conduit to the processing reservoir;

a waste water valve for diverting a waste water flow through the second waste water conduit to the processing reservoir;

a central control unit, wherein the central control unit is in electrical communication with a processing reservoir water level sensor, the purified water valve, the waste water valve, and the adjustable fresh water flow valve;

wherein the purified water valve is configured to divert the purified water flow through the second purified water conduit to the processing reservoir and the waste water valve is configured to divert the waste water flow through the second waste water conduit to the processing reservoir to maintain the pump in a pumping condition such that the amount of processing water is at least as great as a processing water minimum threshold, thereby reducing cycling of the pump and TDS creep; and wherein the central control unit is configured for controlling the fresh water flow from the fresh water source by sending signals to adjust the adjustable fresh water flow valve such that the fresh water flow maintains the amount of processing water within the processing reservoir at a level that satisfies the processing water minimum threshold thereby reducing a frequency at which the adjustable fresh water flow valve moves between a fully open and a fully closed position and to prevent water hammering at the fresh water source.

9. The control system of claim 8, wherein the purified water valve is a solenoid that diverts the purified water from the first purified water conduit to the processing reservoir when the amount of processing water is below the processing water minimum threshold, and allows water to flow to the purified water reservoir when the amount of processing water is at least as great as the processing water minimum threshold.

10. The control system of claim 8, wherein the waste water valve is a solenoid that diverts the waste water from the second waste water conduit to the processing reservoir when the amount of processing water is below the processing water minimum threshold and allows water to exit the system when the amount of processing water is at least as great as the processing water minimum threshold.

11. The control system of claim 8, wherein the processing reservoir water level sensor is an electric liquid level sensor.

12. A method for reducing pump cycling and TDS creep when producing purified water from a water source, the method comprises:
    providing a feed water conduit providing fluid communication from a feed water source to the processing reservoir;
    providing a processing reservoir for storing processing water from the feed water source;
    providing a pressure vessel assembly in fluid communication with the processing reservoir and having a reverse osmosis membrane for producing purified water;
    providing a pump for forcing the processing water though the reverse osmosis membrane to produce purified water;
    providing a processing reservoir water level sensor for monitoring an amount of the processing water in the processing reservoir;
    providing a purified water reservoir in fluid communication with the pressure vessel assembly and for receiving purified water from the pressure vessel assembly;
    providing a purified water conduit providing fluid communication from the pressure vessel assembly to the purified water reservoir;
    providing a second purified water conduit downstream from the pressure vessel assembly providing fluid communication between the purified water conduit back to the processing reservoir;
    providing a purified water valve for diverting a purified water flow through the second purified water conduit back to the processing reservoir;
    providing a first waste water conduit providing fluid communication from the pressure vessel assembly to an egress of the system;
    providing a second waste water conduit downstream from the pressure vessel assembly providing fluid communication from the second waste water conduit to the processing reservoir;
    providing a waste water valve for diverting a waste water flow through from the second waste water conduit to the processing reservoir;
    providing a central control unit for receiving signals, wherein the signals comprise signals from the processing reservoir water level sensor, signals from controlling the purified water valve, and signals from the waste water valve; and
    wherein if the amount of the processing water in the processing reservoir is less than a processing water minimum threshold, then diverting at least one of the waste water flow and the purified water flow back to the processing reservoir to raise the amount of the processing water to maintain the pump in a pumping condition such that the amount of the processing water is at least as great as the processing water minimum threshold, thereby reducing cycling of the pump and TDS creep.

13. The method of claim 12, wherein the purified water valve is a solenoid that diverts the purified water from the first purified water conduit to the processing reservoir when the processing water is below the processing water minimum threshold and allows water to flow to the purified water reservoir when the processing water is at least as great as the processing water minimum threshold.

14. The method of claim 12, wherein the waste water valve is a solenoid that diverts the waste water from the second waste water conduit to the processing reservoir when the processing water is below the processing water minimum threshold and allows water to exit the system when the processing water is at least as great as the processing water minimum threshold.

15. The method of claim 12, wherein the feed water source is a fresh water source.

16. The method of claim 15, wherein the method further comprises:
    monitoring a fresh water flow from the fresh water source to the processing reservoir; and
    controlling the fresh water flow such that the fresh water flow maintains the amount of processing water within the processing reservoir at least as much as the processing water minimum threshold, thereby reducing the frequency at which the adjustable fresh water flow valve moves between a fully open and a fully closed position.

17. The method of claim 16, wherein the method reduces water hammering at the fresh water source.

18. The method of claim 12, wherein the feed water source is at least one of a second water purification system source and a water filtration system source.

19. The method of claim 12, wherein the processing reservoir water level sensor is an electric liquid level sensor.

20. The method of claim 12, wherein the method further includes flushing the reverse osmosis membrane by diverting the purified water flow to move purified water though the reverse osmosis membrane prior to shut down.

\* \* \* \* \*